United States Patent Office 3,306,677
Patented Feb. 28, 1967

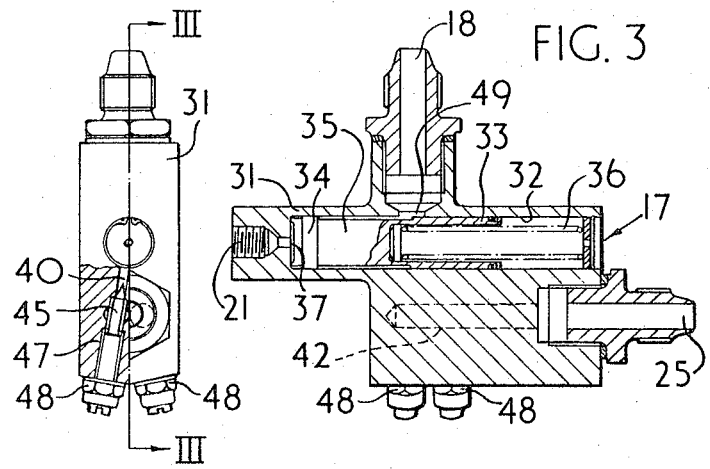
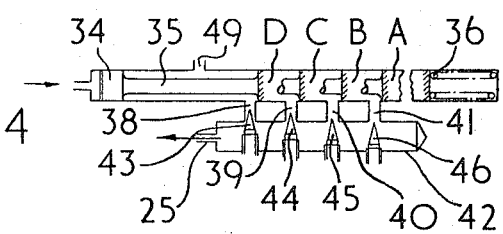
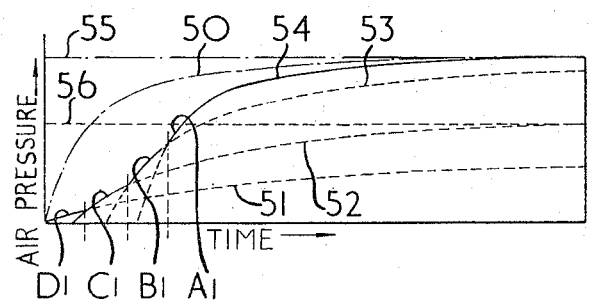

3,306,677
VEHICLE ANTI-SKID BRAKING SYSTEM
Douglas Dewar, Wolston, near Coventry, and John Walter Davis, Balsall Common, England, assignors to Dunlop Rubber Company Limited, Birmingham, England, a corporation of Great Britain
Filed Apr. 28, 1966, Ser. No. 546,024
Claims priority, application Great Britain, May 4, 1965, 18,850/65
8 Claims. (Cl. 303—21)

This invention relates to vehicle anti-skid braking systems and particularly to systems of the kind which incorporate a skid-sensing device arranged to release at least one of the brakes of the vehicle whenever an associated wheel is about to lock and skid.

The object of the present invention is to provide means for regulating the rate at which reapplication of the brakes takes place following their release by an operation of the skid-sensing device.

According to the invention, a vehicle braking system comprises a hydraulic brake operating mechanism associated with the brake of at least one wheel of the vehicle and connected to a source of hydraulic pressure, a cut-off valve for interrupting the connection between the source of hydraulic pressure and the brake operating mechanism, a plunger movable in a cylinder connected to the brake operating mechanism and arranged to control the hydraulic pressure therein after the cut-off valve has interrupted the connection between the source of hydraulic pressure and the brake operating mechanism, means for controlling the position of the plunger comprising a pneumatically operated servo device arranged to apply a thrust to the plunger, a skid-sensing device associated with the vehicle wheel and arranged to control the admission or release of air pressure to or from the servo device so as to cause a reduction in the thrust exerted on the plunger by the servo device and thereby to release the brake whenever the wheel tends to lock and to control the admission or release of air pressure to or from the servo device so as to cause an increase in the thrust exerted on the plunger by the servo device and thereby to effect reapplication of the brake when the tendency for the wheel to lock has been overcome, a flow-restricting device arranged to reduce the rate at which air is admitted to or released from the servo device to effect reapplication of the brake, and means for varying the restriction offered by the flow-restricting device in accordance with the thrust generated by the servo device so as to provide a relatively restricted flow of air when the thrust generated is low and a relatively less restricted flow of air when the thrust generated is high.

Where reference is made, in the preceding paragraph, to a pneumatically operated servo device it will be understood that the term "pneumatic" embraces operation by air at a pressure greater than atmospheric pressure or by air at a pressure below atmospheric pressure, or in other words, by air pressure or vacuum. The servo device, essentially, is operable by a pressure difference, and preferably the maximum differential pressure available in the system and the area of the piston or diaphragm of the servo device are selected to provide a maximum thrust which is considerably in excess of that required to bring the brake fully into operation.

Two embodiments of the invention will now be described, by way of example, with reference to the accompanying drawings, in which:

FIGURE 2 is an end view, partly in cross-section, showing a flow-restricting device of the system shown in FIGURE 1;

FIGURE 3 is a cross-sectional view, taken on the line III—III of FIGURE 2;

FIGURE 4 is a diagrammatic illustration of part of the device shown in FIGURES 2 and 3, showing various positions of a restrictor valve member;

FIGURE 5 is a graph showing the buildup of pressure in a servo device associated with the device shown in FIGURES 2 and 3;

Figure 1:
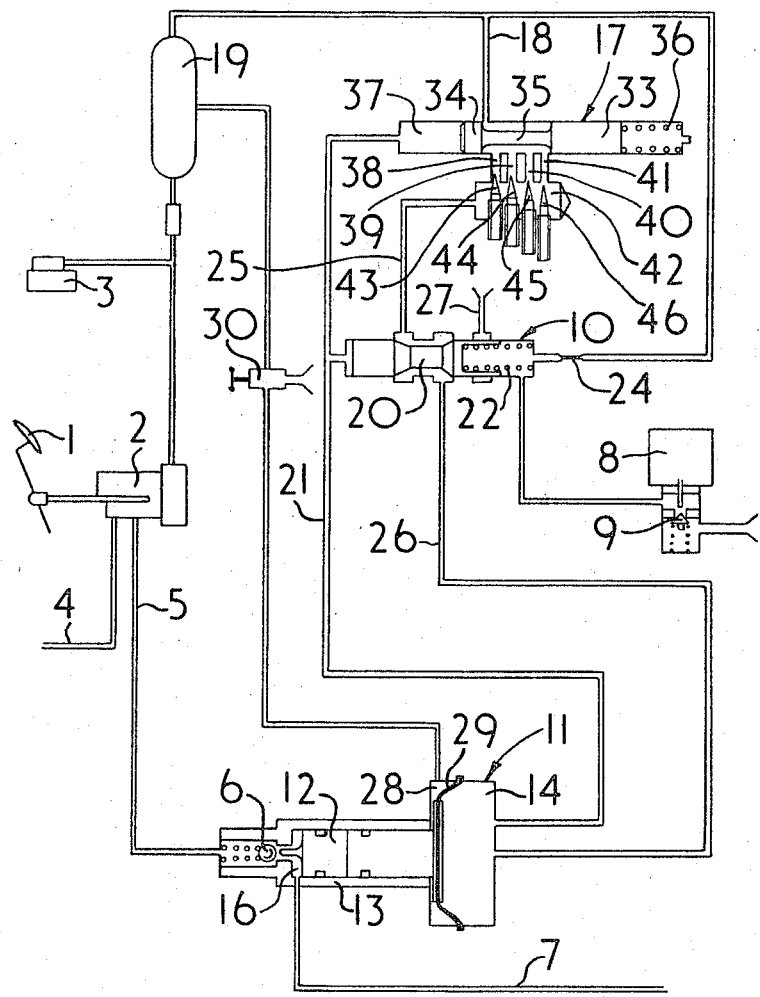
FIGURE 1 is a diagrammatic illustration of an anti-skid braking system.

A vehicle braking system suitable for the tractor portion of an articulated vehicle is shown in FIGURE 1. In this system the brakes of the tractor are operated by a conventional hydraulic system controlled by a driver's foot pedal 1 acting on a power-assisted master cylinder 2 supplied with compressed air from a compressor 3 driven by the engine. The front brakes of the tractor are supplied with hydraulic fluid through a line 4 and the rear brakes through a line 5 which leads through a cut-off valve 6 to the rear brake line 7.

A skid-sensing device is driven from the propeller shaft of the vehicle and contains a valve 9 which controls the operation of a relay valve 10 which in turn governs the operation of a pneumatically operated servo device 11 arranged to apply a thrust to a plunger 12 which is movable in a cylinder 13 connected to the brake actuating mechanism of the rear wheels of the tractor, the thrust being automatically reduced by operation of the relay valve whenever a skid is about to develop. The cut-off valve 6 interrupts the connection between the hydraulic line 5 and the rear brake actuating mechanism whenever the plunger 12 is withdrawn, following a reduction in pressure in the chamber 14 of the servo device, from a position at the end of the cylinder adjacent the valve 6. Movement of the plunger 12 along its cylinder away from the valve 6 creates an increased volume in the space 16 into which the fluid contained in the brake actuating mechanism can expand, and thus releases the rear brakes to check an incipient skid.

When the rear wheels begin to re-establish a grip on the road surface the skid-sensing device 8 closes its valve 9 and causes the relay valve 10 to supply air under pressure to the chamber 14 of the servo device 11 to create a thrust which drives the plunger 12 back along its cylinder to reapply the brakes. The rate at which the brake-applying pressure is built up depends on the rate at which air is allowed to flow into the chamber 14 of the servo device, and in accordance with the present invention a flow-restricting device 17 is provided in the compressed air supply line 18 from a reservoir 19 which is connected by the relay valve 10 to the servo device 11, to govern the rate at which air is supplied thereto following an operation of the system to check an incipient skid.

The relay valve 10 comprises a spool valve member 20 subjected at one side to the pressure in chamber 14 of the servo device 11 conveyed through a line 21 and at the other side to the pressure of a spring 22 and to pneumatic pressure supplied from the reservoir 19 through a line 23 and a restriction 24. In the normal state of the relay valve the spool valve member 20 is in the position shown in FIGURE 1, connecting the chamber 14, through lines 25 and 26, to the pressure supply line 18.

When the skid-sensing device 8 opens its valve 9 the pressure at the associated end of the relay valve drops and the member 20 moves to a position in which it connects the line 26 from the chamber 14 to an exhaust port 27, thus releasing the air pressure therefrom. The other chamber 28 of the servo device 11, on the opposite side of its diaphragm 29, is connected through a pressure reducing valve 30 to the reservoir 19 and is thus maintained at a low pressure relative to the maximum pressure which can be supplied to the chamber 14.

When the skid-sensing device 8 closes its valve 9, the pressure at the associated end of the relay valve is built up through the line 23 and restrictor 24, the valve member 20 returns to the position shown in FIGURE 1, and air then flows into the chamber 14 of the servo device 11 through lines 25 and 26 and the flow-restricting device 17.

The flow-restricting device 17 consists of a housing 31 having a cylindrical bore 32 in which a restrictor valve member 33 is slidable. The restrictor valve member 33 is integral with a restrictor plunger 34 and is provided with a reduced-diameter central portion 35, the member 33 being urged by a restrictor return spring 36 towards the end 37 of the bore, which is connected by the line 21 to the chamber 14 of the servo device 11.

Four radial holes 38, 39, 40, 41 are drilled through the wall of the cylindrical bore 32 in spaced-apart axial positions, and communicate with an outlet passage 42 formed in the housing parallel to the cylindrical bore and connected by the line 25 via the relay valve to the chamber 14 of the servo device 11. The holes 38, 39, 40, 41 are provided, respectively, with needle valves 43, 44, 45, 46, the needle valves being adjusted to provide orifices of graduated sizes and the arrangement being such that the orifices can be closed in succession by the valve member 33 as it moves towards the end 37 of the bore 32. The valves 43–46 are screwed into screw-threaded bores 47 in the housing 31 and are locked in position by lock nuts 48. An inlet opening 49 is provided in the wall of the bore in a position in which it will not be covered by the valve member 33 in any position of the valve member and is connected to the compressed air supply line 18.

FIGURE 4 shows diagrammatically four positions A, B, C and D of the restrictor valve member 33. In operation, the position of the member 33 is dependent on the pressure in the chamber 14 of the servo device 11 communicated to the end 37 of the cylindrical bore 32 and acting to move the valve member against the spring 36. When the pressure is high the member 33 is in position A in which all four of the outlet orifices 38–41 are uncovered, and the compressed air from line 18 is allowed to flow at a relatively rapid rate to the servo device 11 to effect re-application of the brakes. When the pressure in the chamber 14 of the servo device has fallen to a relatively lower level, the pressure at the end of the cylindrical bore will be insufficient to prevent the valve member 33 from moving under the force of the spring 36 to cover one or more of the orifices as shown in positions B, C and D of FIGURE 4 and thus reduce the rate of flow of the compressed air to the servo device.

The effect of the flow-restricting device 17 is therefore to provide a relatively rapid re-application of the brakes following an operation of the system to check a tendency to skid under relatively good road surface and loading conditions, when brake pressure is high, and a relatively more gradual reapplication of the brakes following an operation of the system to check a more serious tendency to skid, under adverse conditions, where braking pressure has to be reduced to a low level for skid correction.

FIGURE 5 illustrates the characteristics of the chamber 14 of the servo device without a flow restrictor (curve 50), and with the flow restricting device 17 in operation (curves 51, 52, 53, 54). The pressure of the supply from reservoir 19 is indicated by line 55, and the pressure in the chamber 14 required to balance the maximum working hydraulic pressure in the brake line 5 is indicated by line 56. The portions $D_1$, $C_1$, $B_1$, $A_1$ of the curves 51 to 54 correspond respectively to the positions D, C, B, A of the valve member 33 as it moves under the rising pressure from the chamber 14 during reapplication of the brake starting from zero pressure in the chamber 14.

It will be noted that the envelope of the curves $A_1$, $B_1$, $C_1$, $D_1$, provides a curve of gradually increasing slope as it rises towards the pressure indicated by the line 56. This characteristic is the reverse of that which would be achieved without a variable flow-restrictor, as indicated by the curve 50, and, as explained above, provides the maximum braking effect to suit the prevailing circumstances during each reapplication of the brakes.

In order that the flow-restricting device 17 should be able to provide an adequate degree of control over the rate of build-up of pressure in the chamber 14 of the servo device, it is preferable that the air pressure available to operate the servo device should be considerably in excess of the pressure required to produce maximum braking effort. If this high pressure were not available, the difference between the pressure of the supply and the pressure in the servo device would not be sufficient to provide a rapid flow of air when a high pressure was already present in the servo device, and the flow-restricting device would therefore not be fully effective to control the flow in the manner described above.

Figure 6:
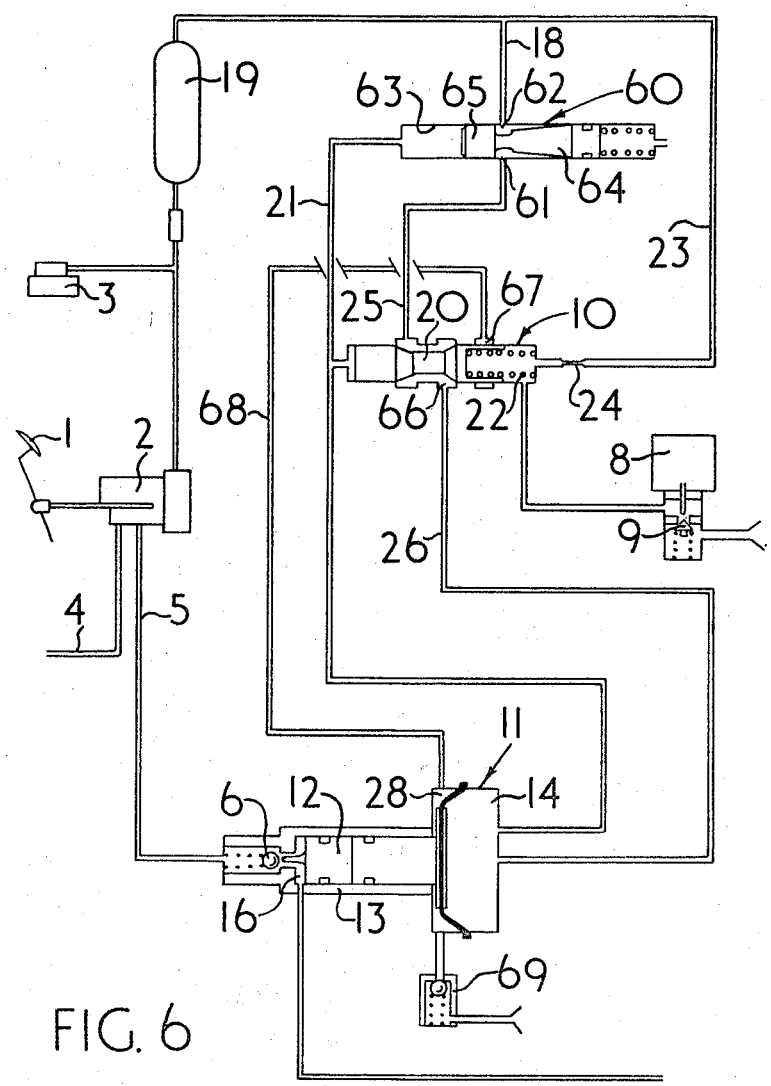
FIGURE 6 is a diagrammatic illustration of an anti-skid braking system incorporating an alternative flow-restricting device.
Figure 7:
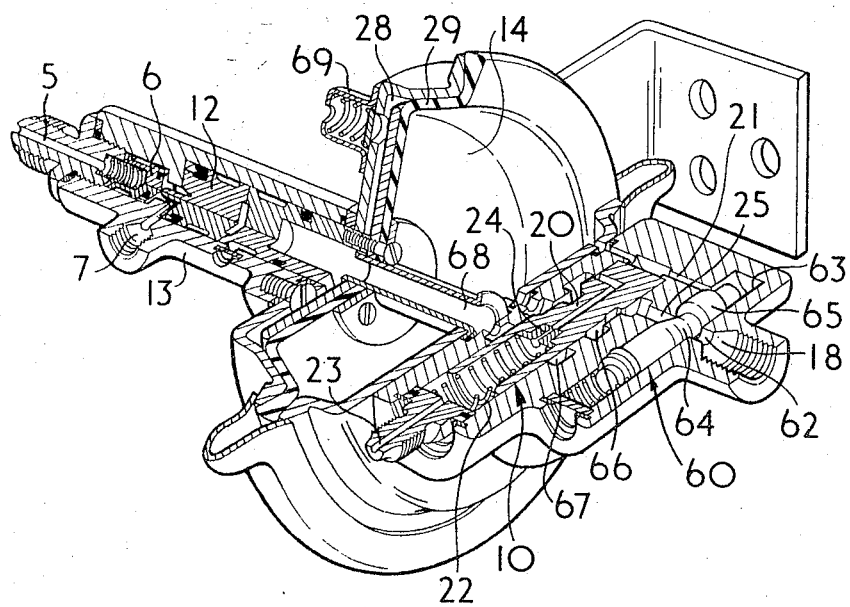
FIGURE 7 is a diagrammatic perspective view showing part of a servo device and an associated relay valve and flow-restricting device contained in a common housing, forming part of the system shown in FIGURE 6.

In the alternative embodiment shown in FIGURES 6 and 7, the flow-restricting device 60 and its associated system are constructed on similar general lines to the device 17 described above and similar reference numerals have been used for identical components. In the device 60, instead of having four separate outlet orifices of varied sizes, only one outlet orifice 61 is provided, and is positioned diametrically opposite to the inlet opening 62 in a common axial position in the midportion of the cylindrical valve bore 63. The restrictor valve member 64 is frustroconical in form, tapering towards the restrictor plunger 65. Depending on the position of the valve member 64, more or less obstruction is offered to the flow of air from the inlet opening 62 to the outlet orifice 61, and thus the rate of flow of air to the servo device is controlled in a similar manner to the operation of the device described above.

Apart from the different forms of flow restricting device used, the systems shown in FIGURES 1 and 6 differ only in respect of the operation of the servo device 11 to release the brakes. Instead of exhausting the chamber 14 to atmosphere, a connection is made by the relay valve 10 through ports 66 and 67 and a passage 68 between the chambers 14 and 28, thus tending to equalize the pressures in these chambers to reduce the thrust on the plunger 12. A spring-loaded check valve 69 allows air pressure in the chamber 28 to escape to atmosphere until a predetermined low pressure is reached.

In the arrangement shown in FIGURE 7 the relay valve 10 and the variable flow-restricting device 60 are contained in a common housing attached to the servo device.

The flow-restricting device shown in FIGURES 1 to 3 has the advantage that the individual outlet orifices can be adjusted separately to vary the degree of restriction offered at various values of the pressure, and is thus particularly suitable for experimental use or other applications where adjustment of the characteristics of the restrictor, to suit various operating conditions, is required. The second flow-restricting device shown in FIGURES 6 and 7 has the advantage that it is relatively simple and cheap to produce, and provides a restriction which varies in a continuous manner as the valve member is moved.

Having now described our invention what we claim is:

1. A vehicle braking system comprising a hydraulic brake operating mechanism associated with the brake of at least one wheel of the vehicle and connected to a source of hydraulic pressure, a cut-off valve for interrupting the connection between the source of hydraulic pressure and the brake operating mechanism, a plunger movable in a cylinder connected to the brake operating mechanism and arranged to control the hydraulic pressure therein after the cut-off valve has interrupted the connection between the source of hydraulic pressure and the brake operating mechanism, means for controlling the position of the plunger comprising a pneumatically operated servo device arranged to apply a thrust to the plunger, a skid-sensing device associated with the vehicle wheel and arranged to change the air pressure in the servo device so as to cause a reduction in the thrust exerted on the plunger by the servo device and thereby to release the brake whenever the wheel tends to lock and to change the air pressure in the servo device so as to cause an increase in the thrust exerted on the plunger by the servo device and thereby to effect re-application of the brake when the tendency for the wheel to lock has been overcome, a flow-restricting device arranged to reduce the rate at which the air pressure is changed in the servo device to effect re-application of the brake, and means for varying the restriction offered by the flow-restricting device in accordance with the thrust generated by the servo device so as to provide a relatively restricted flow of air when the thrust generated is low and a relatively less restricted flow of air when the thrust generated is high.

2. A system according to claim 1 wherein the flow-restricting device comprises a restrictor valve member attached to a restrictor plunger which is movable in a cylindrical bore of a restrictor valve housing, one end of the bore being conected to the servo device so as to subject the restrictor plunger to the pneumatic operating pressure supplied to the servo device, and a restrictor return spring being provided to oppose movement of the restrictor plunger under the said operating pressure, the bore having openings disposed on opposite sides of the bore through which air may flow across the bore to re-apply the servo device and the restrictor valve member being arranged in the bore to restrict the flow of air to re-apply the servo device, the flow being restricted to a greater extent when the operating pressure supplied to the servo device is low than when the operating pressure is high.

3. A system according to claim 2 wherein the bore of the restrictor valve housing is provided on one side with a series of openings in spaced positions along the bore and an opening on the diametrically opposite side of the bore, each opening of the series of openings being arranged so that it can be closed by the restrictor valve member, the arrangement being such that the series of openings can be opened in succession by movement of the restrictor valve member along the bore to provide a relatively reduced obstruction to the flow of air across the bore as the operating pressure of the servo device increases.

4. A system according to claim 3 wherein each opening of the series of openings is provided with a needle valve and the needle valves are adjusted to present a series of orifices of graduated sizes.

5. A system according to claim 2 wherein the restrictor valve member is of tapering cross-section and is arranged to be moved along the bore by the operating pressure towards a position in which it offers a reduced obstruction to the flow of air across the bore.

6. The system according to claim 1 incorporating a relay valve arranged to be operated by the skid-sensing device to change the air pressure in the servo device.

7. A system according to claim 6 wherein the relay valve and the flow-restricting device are contained in a common housing attached to the servo device.

8. A tractor portion of an articulated vehicle having a braking system according to claim 1 associated with the rear wheels thereof.

No references cited.

EUGENE G. BOTZ, *Primary Examiner.*